(12) United States Patent
Shimazaki et al.

(10) Patent No.: US 7,178,505 B2
(45) Date of Patent: Feb. 20, 2007

(54) DIESEL ENGINE

(75) Inventors: Naoki Shimazaki, Fujisawa (JP);
Terukazu Nishimura, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 36 days.

(21) Appl. No.: 11/093,218

(22) Filed: Mar. 29, 2005

(65) Prior Publication Data

US 2005/0217644 A1    Oct. 6, 2005

(30) Foreign Application Priority Data

Mar. 31, 2004  (JP) .............................. 2004-103049

(51) Int. Cl.
*F02P 5/00*   (2006.01)
*F02P 5/145*  (2006.01)

(52) U.S. Cl. .............................. 123/406.47; 123/406.37

(58) Field of Classification Search ................ 123/295, 123/305, 430, 478, 406.47, 406.12, 406.21, 123/406.29, 406.37
See application file for complete search history.

(56) References Cited

U.S. PATENT DOCUMENTS

| 4,448,163 | A | * | 5/1984 | Yoshida .................. 123/406.36 |
| 4,716,873 | A | * | 1/1988 | Takaba et al. .......... 123/406.34 |
| 5,158,057 | A | * | 10/1992 | Ikeura et al. ........... 123/406.36 |
| 5,749,334 | A | * | 5/1998 | Oda et al. .................... 123/305 |
| 5,875,756 | A | * | 3/1999 | Kamura et al. .............. 123/295 |
| 6,467,452 | B1 | * | 10/2002 | Duffy et al. ................. 123/299 |
| 6,886,334 | B2 | | 5/2005 | Shirakawa |
| 7,007,663 | B2 | * | 3/2006 | Mashiki ....................... 123/305 |

FOREIGN PATENT DOCUMENTS

| DE | 199 52 096 A1 | 5/2001 |
| DE | 102 33 612 A1 | 2/2004 |
| EP | 0 905 361 A2 | 9/1998 |
| EP | 1 471 241 A2 | 10/2004 |
| JP | 2003-083119 | 3/2003 |

OTHER PUBLICATIONS

Copy of International Search Report for Serial No. EP 05 00 6309 dated Aug. 18, 2006.

* cited by examiner

*Primary Examiner*—Mahmoud Gimie
(74) *Attorney, Agent, or Firm*—McCormick, Paulding & Huber LLP

(57) ABSTRACT

A diesel engine comprising a fuel injection device (9), an EGR device (19), and a control device (26) for controlling the fuel injection device (9) and EGR device (19) so as to realize a premixed combustion in which a mixture is ignited after the end of fuel injection, the diesel engine further comprising detection unit (31) for detecting the ignition timing of the mixture, wherein when the actual ignition timing detected by the detection unit (31) shifts from the preset optimum ignition timing, the control device (26) corrects the timing of fuel injection conducted by the fuel injection device (9) and matches the actual ignition timing with the optimum ignition timing.

12 Claims, 2 Drawing Sheets

DIESEL ENGINE

CROSS REFERENCE TO RELATED APPLICATION

The applicants hereby claim foreign priority benefits under U.S.C. § 119 of Japanese Patent Application No. 2004-103049 filed on Mar. 31, 2004, and the content of which is herein incorporated by reference.

BACKGROUND OF THE INVENTION

1. Field of the Invention

The present invention relates to a diesel engine in which a premixed combustion is implemented, and more particularly to a diesel engine with an optimized ignition timing or premixing period in the premixed combustion.

2. Description of the Related Art

In diesel engines, fuel is typically injected close to a compression top dead center of the piston when the temperature and pressure inside the cylinder are high. In this case, the fuel (mixture) is ignited producing a flame during fuel injection and the combustion is maintained by supplying subsequently injected fuel into this flame. In such a conventional combustion mode, there is a portion of the initially injected fuel that is combusted after the ignition delay period, which causes a problem with NOx (nitrogen oxide). There is also a portion combusted in the combustion gas with an insufficient amount of oxygen, which causes a problem with smoke generation.

Accordingly, the applicants have suggested a diesel engine in which the fuel injection timing was before the compression top dead center and the mixture was ignited after the end of fuel injection (Japanese Patent Application Laid-open No. 2003-83119).

In such a diesel engine, the mixture is ignited once a certain interval elapses after the end of fuel injection. As a result, the mixture is sufficiently leaned and homogenized before the ignition. Therefore, a local combustion temperature decreases and the amount of released NOx is decreased. Furthermore, the emission of smoke is also inhibited because local combustion in an air-deficient state is avoided.

The combustion mode in which the mixture is ignited after the end of fuel injection will be referred to in the present specification as "premixed combustion", and the period from the end of fuel injection to the ignition will be referred to as "premixing period".

The premixed combustion is effective for improving the exhaust gas, but the following two problems are encountered when such combustion is realized.

(1) Difficulty of ensuring the premixing period: in the operation region with a comparatively large fuel injection quantity, the mixture is sometimes ignited during fuel injection even if the fuel is injected rapidly. In this case, the combustion mode of the mixture becomes identical to the conventional combustion. Therefore, there is no improvement with regards to the exhaust gas.

(2) Difficulty of controlling the ignition timing: in the conventional combustion mode in which the ignition starts during fuel injection, the ignition timing can be controlled by controlling the fuel injection timing. However, because a premixing period exists in the premixed combustion and the ignition timing is governed by external parameters such as the temperature inside the cylinder, pressure inside the cylinder, and air/fuel ratio, the ignition timing cannot be accurately controlled by merely controlling the fuel injection timing. In the case of inadequate ignition timing of the mixture in the premixed combustion, there is no improvement with regards to the exhaust gas. Moreover, the efficiency is degraded (fuel consumption is degraded) or combustion noise is generated. For example, if the ignition timing of the mixture is too early (even before the top dead center), thermal loss is increased and the compression induced by the piston is received after the ignition. Therefore, the temperature inside the cylinder rises, and there is a risk of generating NOx and degrading fuel consumption.

The Applicants have discovered that controlling an EGR (exhaust gas recirculation) ratio together with the fuel ignition timing is effective for resolving those two problems. In other words, if the EGR ratio is increased, the concentration of oxygen in the mixture decreases. Therefore, the premixing period is extended (ignition timing is delayed). Conversely, if the EGR ratio is decreased, the premixing period is shortened (ignition timing occurs earlier). Therefore, the premixing period and ignition timing can be optimally controlled by adequately controlling the EGR ratio in combination with controlling the fuel injection timing. This technology was not publicly known at the time the present application was filed and does not constitute prior art.

However, though the fuel injection timing can be comparatively accurately controlled by controlling the electric actuation timing of the injector, the EGR ratio is difficult to control stringently.

For example, because the EGR ratio is also influenced by parameters other than the control parameters relating to the EGR apparatus (for example, the EGR valve opening degree in the external EGR apparatus), the EGR ratio sometimes fluctuates under the effect of other factors even when the control parameters relating to the EGR apparatus are constant.

Furthermore, there is a substantial time lag from the instant the control parameters relating to the EGR apparatus have changed to the instant the EGR ratio of the mixture actually changes, due to the response delay of the EGR valve and the existence of the volume portion associated with the distance (intake path) from the EGR valve to the combustion chamber. For this reason, when the fuel injection timing and EGR apparatus are controlled, a temporary mismatch sometimes occurs between the two.

Thus, because the EGR ratio is difficult to control stringently, the ignition timing or premixing period of the mixture sometimes can become temporarily inadequate, creating a risk of degrading the exhaust gas or fuel consumption.

SUMMARY OF THE INVENTION

Accordingly, it is an object of the present invention to conduct the optimum control of the ignition timing of the mixture in the premixed combustion.

It is another object of the present invention to conduct the optimum control of the premixing period of the mixture in the premixed combustion.

In accordance with one aspect of the present invention, there is provided a diesel engine comprising a fuel injection apparatus for injecting a fuel into a combustion chamber, an EGR (exhaust gas recirculation) apparatus for returning part of exhaust gas into the combustion chamber, and a control apparatus for controlling the fuel injection apparatus and EGR apparatus so as to realize a premixed combustion in which a mixture is ignited after the end of fuel injection, the diesel engine further comprising detection means for detecting the ignition timing of the mixture, wherein when the actual ignition timing detected by the detection means shifts from the preset optimum ignition timing, the control apparatus corrects the timing of fuel injection conducted by the fuel injection apparatus and matches the actual ignition timing with the optimum ignition timing.

With such a configuration, because an adequate ignition timing can be constantly ensured, the degradation of fuel consumption or exhaust gas can be reliably avoided.

Here, the control apparatus may determine the target fuel injection timing based on the engine operation state, control said fuel injection apparatus according to the target fuel injection timing, correct the target fuel injection timing to a retard angle side when the actual ignition timing detected by the detection means is earlier than the optimum ignition timing, and, conversely, correct the target fuel injection timing to the advance angle side when the actual ignition timing is later than the optimum ignition timing.

Further, the detection means for detecting the ignition timing of the mixture may be a knock sensor.

The optimum ignition timing may be a compression top dead center of a piston.

Further, a computation formula having set therein a correction quantity of the fuel injection timing that is necessary for eliminating the difference between the actual ignition timing and the optimum ignition timing may be inputted into the control apparatus, and the control apparatus may correct the timing of fuel injection conducted by the fuel injection apparatus according to the correction quantity determined from the computation formula when the actual ignition timing detected by the detection means shifts from the preset optimum ignition timing.

In accordance with another aspect of the present invention, there is provided a diesel engine comprising a fuel injection apparatus for injecting a fuel into a combustion chamber, an EGR apparatus for returning part of exhaust gas into the combustion chamber, and a control apparatus for controlling the fuel injection apparatus and EGR apparatus so as to realize a premixed combustion in which a mixture is ignited after the end of fuel injection, the diesel engine further comprising measurement means for measuring the premixing period from the end of fuel injection conducted by the fuel injection apparatus to the mixture ignition, wherein when the actual premixing period measured by the measurement means shifts from the preset optimum premixing period, the control apparatus corrects the timing of fuel injection conducted by the fuel injection apparatus and matches the actual premixing period with the optimum premixing period.

With such a configuration, an adequate premixing period can be constantly ensured, and the exhaust gas can be effectively improved.

Here, the control apparatus may determine the target fuel injection timing based on the engine operation state, control the fuel injection apparatus according to the target fuel injection timing, correct the target fuel injection timing to a retard angle side when the actual premixing period measured by the measurement means is longer than the optimum premixing period, and, conversely, correct the target fuel injection timing to the advance angle side when the actual premixing period is shorter than the optimum premixing period.

Further, the optimum premixing period may be established for each engine operation state.

DESCRIPTION OF THE PREFERRED EMBODIMENTS

Figure 1:
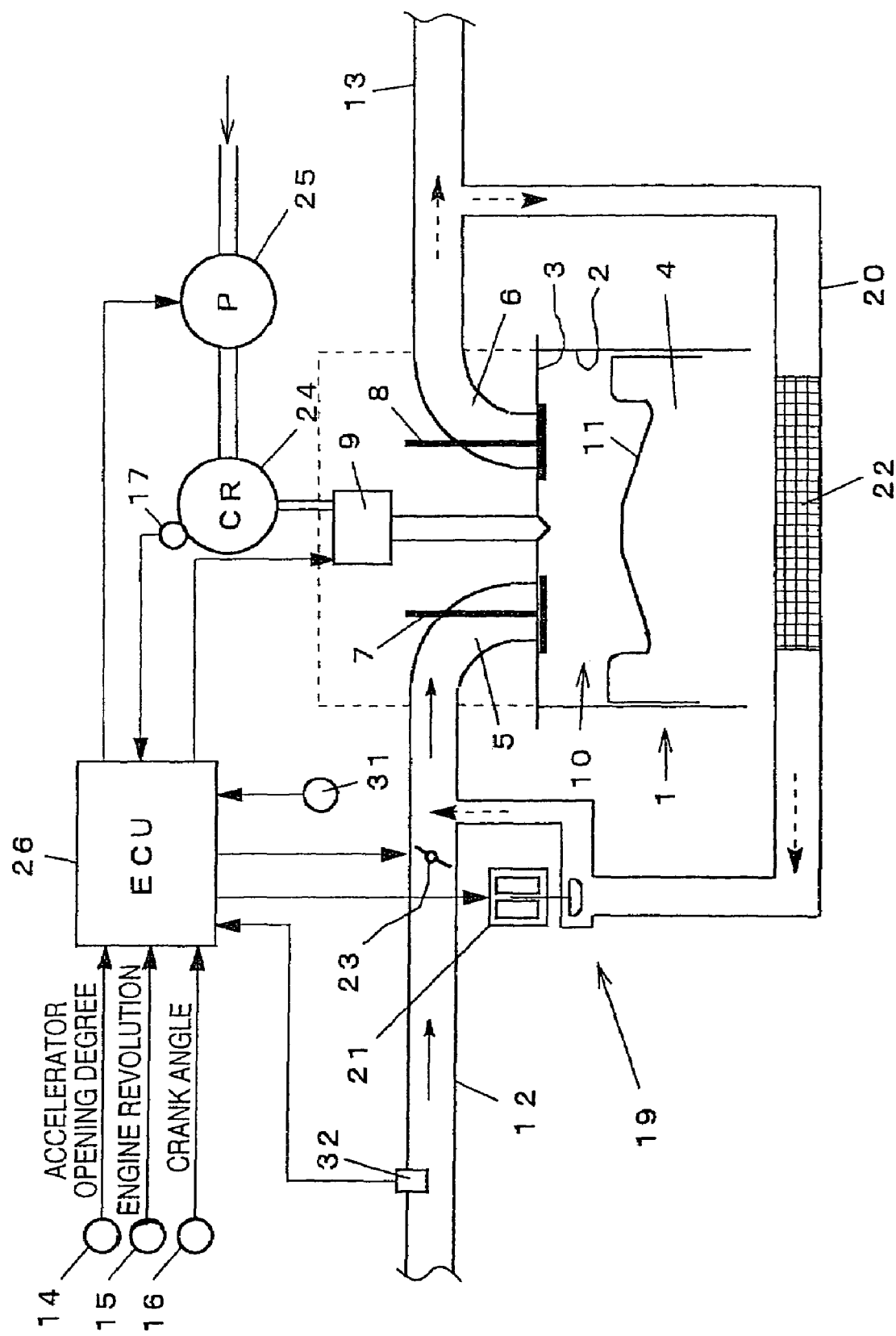
FIG. 1 is a schematic view of the diesel engine of an embodiment of the present invention.

A preferred embodiment of the present invention will be described below based on the appended drawings FIG. 1 is a schematic drawing of a diesel engine (referred to hereinbelow simply as "engine") of the present embodiment. In FIG. 1, only one cylinder is shown, but obviously a configuration with multiple cylinders is possible.

In FIG. 1, the reference symbol 1 stands for an engine body. This engine comprises a cylinder 2, a cylinder head 3, a piston 4, an intake port 5, an exhaust port 6, an intake valve 7, an exhaust valve 8, and an injector 9. A cavity 11 is formed in the head portion of the piston 4, and a combustion chamber 10 is formed in the space surrounded by this cavity 11, cylinder 2, and cylinder head 3. Fuel is directly injected from the injector 9 into the combustion chamber 10. The cavity 11 of the present embodiment has a form of a toroidal combustion chamber with a protruding center of the bottom portion. However, the present invention places no limitation on the shape of the combustion chamber 10 and it may be a reentrance combustion chamber of the like.

The injector 9 is disposed coaxially with the cylinder 2, and fuel is injected radially at the same time from a plurality of holes. The injector 9 is connected to a common rail 24, and the high-pressure fuel stored in the common rail 24 is constantly supplied to the injector 9. The fuel is pumped by a high-pressure supply pump 25 to the common rail 24.

The intake port 5 is connected to an intake pipe 12, and the exhaust port 6 is connected to an exhaust pipe 13.

The engine of the present embodiment further comprises an external EGR apparatus 19 for returning part of exhaust gas into the combustion chamber 10. The EGR apparatus 19 comprises an EGR pipe 20 for connecting the intake pipe 12 and exhaust pipe 13, an EGR valve 21 for adjusting the EGR ratio by changing the cross-sectional surface area of the passage of the EGR pipe 20, and an EGR cooler 22 for cooling the EGR gas upstream of the EGR valve 21. An intake throttle valve 23 for appropriately throttling the intake air upstream of the connection zone with the EGR pipe 20 is provided in the intake pipe 12.

An ECU (electronic control unit) 26 for electronically controlling the engine is also provided. The ECU 26 reads the operation state of the engine from a variety of sensors and controls the injector 9, EGR valve 21, and intake throttle valve 23 based on the engine operation state. An accelerator opening sensor 14 for detecting the accelerator opening degree, an engine revolution sensor 15 for detecting the revolution speed of the engine, a crank angle sensor 16 for detecting the angle of the crankshaft (not shown in the figure) of the engine, a common rail pressure sensor 17 for detecting the fuel pressure in the common rail 24, and an intake quantity sensor 32 for detecting the intake air quantity (new air flow rate) flowing through the intake pipe 12 upstream of the connection zone with the EGR pipe 20 are comprised as the aforementioned sensors, and the detection values of those sensors are inputted in the ECU 26.

The ECU 26 of the present embodiment controls the injector 9 and EGR apparatus 19 so as to realize the premixed combustion in which the mixture is ignited after the end of fuel injection.

More specifically, first, the fuel injection timing (injection start timing) and EGR ratio, such that the mixture is ignited after the fuel injection has been entirely completed and the ignition timing becomes an optimum ignition timing (essentially in the vicinity of the compression top dead center of the piston), are found in advance for each engine operation state, the target fuel injection timing map and target EGR valve opening degree map are created based on that data and the maps are inputted into the ECU 26. Once the ECU 26 reads the engine operation state based on the detection values of the accelerator opening degree sensor 14 or engine rotation sensor 15, the target fuel injection timing and target EGR valve opening degree are determined form the maps, and the injector 9 and EGR valve 21 are controlled according to the respective determined values. The target fuel injection timing in the premixed combustion is basically set before (for example, about 40–20° BTDC) the fuel injection timing (close to the compression top dead center of the piston) that is set in the conventional combustion. Furthermore, the target EGR ratio is basically set higher (for example, 50% or higher) than the EGR ratio that is set in the conventional combustion. With such premixed combustion, leaning and homogenization of the mixture are enhanced. Therefore, the quantities of NOx and smoke can be substantially reduced.

Thus, in the diesel engine of the present embodiment, the premixed combustion is implemented by controlling the fuel injection timing and EGR ratio according to the engine operation state. However, as mentioned hereinabove, the EGR ratio is difficult to control stringently. Thus, even when the valve opening degree of the EGR valve 21 is controlled according to the map, the actual EGR ratio sometimes shifts from the optimum EGR ratio (target EGR ratio). As a result, the ignition timing of the mixture shifts from the optimum ignition timing, causing degradation of fuel consumption and exhaust gas.

Accordingly, in the diesel engine of the present embodiment, measures have been taken to prevent the shift in the ignition timing caused by the instability of EGR ratio control. This issue will be described hereinbelow.

As shown in FIG. 1, the diesel engine of the present embodiment comprises a knock sensor 31 attached to the cylinder block as detection means for detecting the ignition timing of the mixture, and the ECU 26 computes and determines the actual ignition timing of the mixture based on the detected value of the knock sensor 31.

Further, the optimum ignition timing (target ignition timing) of the mixture is inputted in advance into the ECU 26, and the ECU 26 compares the actual ignition timing determined based on the detection values of the knock sensor 31 with this optimum ignition timing.

When there is no difference (shift) between the actual ignition timing and optimum ignition timing (target ignition timing), the present EGR ratio can be assumed to have been controlled to the adequate value (target EGR ratio). Accordingly, in this case, the ECU 26 conducts usual control of the injector 9 and EGR valve according to the map.

On the other hand, when the actual ignition timing shifts with respect to the optimum ignition timing, the actual EGR ratio supposedly shifts from the adequate value (target EGR ratio). For example, when the actual ignition timing is earlier than the optimum ignition timing (target ignition timing), the EGR ratio is less than the adequate value (target EGR ratio), and the oxygen concentration of the mixture is apparently too high. Conversely, when the actual ignition timing is later than the optimum ignition timing, the EGR ratio is higher than the adequate value and the oxygen concentration of the mixture is apparently too low.

In such cases, the ECU 26 corrects the target fuel injection timing determined from the map and matches the actual ignition timing with the optimum ignition timing.

An example of such control will be explained by using FIGS. 2a–2c.

In the figures, a crank angle is plotted against the abscissa. T1-a is a target fuel injection timing (injection start timing) determined from the map, T2-a is a target fuel injection period also determined from the map, T3-a to c are actual premixing periods of the mixture, and T4-a to c are actual ignition timings of the mixture. In this example, the optimum ignition timing (target ignition timing) of the mixture is a compression top dead center (TDC) of the piston.

Figure 2A:
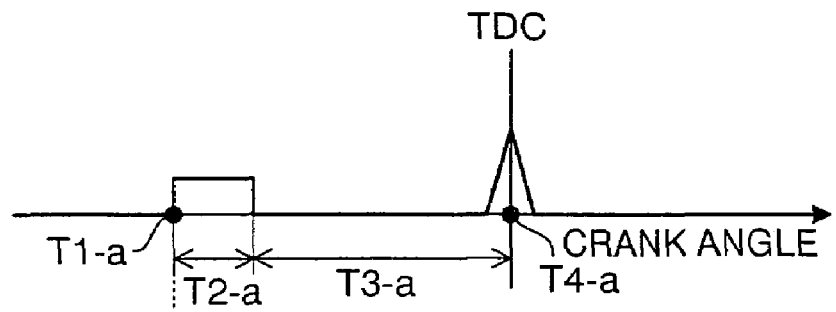
FIG. 2a illustrates an example of a state in which the actual ignition timing matches the optimum ignition timing, and the actual premixing period matches the optimum premixing period.

FIG. 2a shows a state in which the EGR is adequately controlled and the mixture ignition fining is adequate. In other words, as follows from the figure, the mixture is ignited once the premixing period T3-a elapses after the end of fuel injection, and the ignition timing T4-a. matches the optimum ignition timing TDC. Therefore, it can be said that a good combustion state with high exhaust gas purification and good combustion is attained.

However, if the actual EGR ratio shifts from the adequate value for any reason (turbulence, control delay of EGR ratio, and the like), the premixing period of the mixture changes and the ignition timing shifts. For example, when the actual EGR ratio becomes lower than the adequate value (target EGR ratio), the oxygen concentration of the mixture increases. Therefore, as shown in FIG. 2b, the premixing period shortens (T3-a→T3-b), and the ignition timing becomes earlier than the optimum ignition timing TDC (T4-a→T4-b).

Once the ECU 26 recognizes that the actual ignition timing shifts from the optimum ignition timing, it feedback controls (corrects the target fuel injection timing T1-a) the fuel injection timing so that the actual ignition timing matches the optimum ignition timing TDC.

Figure 2B:
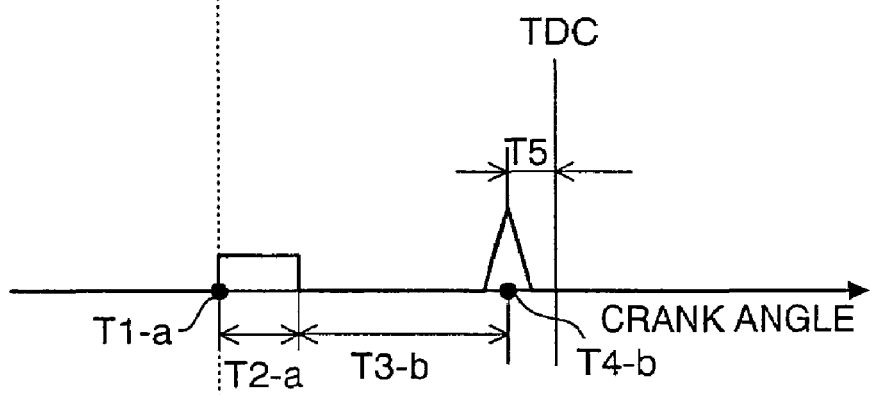
FIG. 2b illustrates an example of a state in which the actual premixing period is shorter than the optimum premixing period, and the actual ignition timing is earlier than the optimum ignition timing.

For example, as shown in FIG. 2b, when the actual ignition timing T4-b is earlier than the optimum ignition timing TDC, first, the ECU 26 computes the difference T5 (see FIG. 2b) between the actual ignition timing T4-b and optimum ignition timing TDC and then determines the correction quantity $\Delta T$ (see FIG. 2c) of the target fuel injection timing T1-a based on the difference T5. More specifically, the relationship between the difference between the actual ignition timing and optimum ignition timing and the correction quantity of the target fuel injection timing necessary to eliminate this difference is found empirically in advance and inputted into the ECU 26, for example, as a computation formula. The ECU 26 determines the correction quantity $\Delta T$ based on the above-mentioned T5 and this computation formula. In the present embodiment, the difference T5 and correction quantity $\Delta T$ are almost equal, but the present invention is not limited to this condition.

Figure 2C:
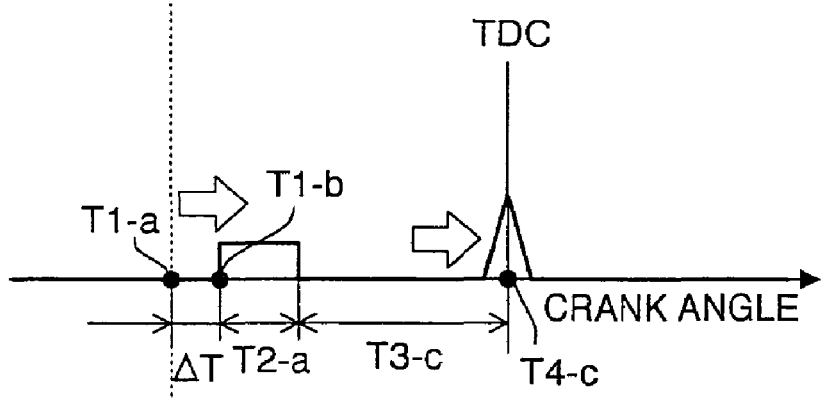
FIG. 2c illustrates an example of a state in which the actual ignition timing was matched with the optimum ignition timing by correcting the fuel injection timing.

Further, once the ECU 26 determines the correction quantity $\Delta T$ of the target fuel injection timing T1-a, as shown in FIG. 2c, it corrects the target fuel injection timing T1-a to the retard angle side by the correction quantity ΔT (T1-a→T1-b) and electrically actuates the injector 9 according to the target fuel injection timing T1-b after the correction. As a result, the ignition timing of the mixture moves to the retard angle side and becomes the optimum ignition timing TDC (T4-b→T4-c).

Further, as shown in FIG. 2c, the sufficient premixing period T3-c apparently can be ensured even after correcting the fuel injection timing to the delay angle side. This can be explained as follows. As was described hereinabove, in the premixed combustion, because the fuel injection is conducted early, the pressure inside the cylinder during injection is low and, in addition, a large amount of EGR decreases the absolute value of oxygen concentration in the mixture.

If the EGR ratio returns to the adequate value after the fuel injection timing has been corrected, the ignition timing moves to the delay angle side. The ECU 26 accordingly moves the fuel injection timing T1-b to the advance angle side. In other words, the correction of the target fuel injection timing is completed. As a result, it is possible to return again to the advantageous premixed combustion such as shown in FIG. 2a.

Further, when the actual ignition timing is later than the optimum ignition timing TDC, the target fuel injection timing T1-a is corrected to the advance angle side and the actual ignition timing is matched with the optimum ignition timing TDC.

Thus, in the diesel engine of the present embodiment, the fuel injection timing is corrected and the ignition timing is maintained as an optimum ignition timing once the EGR ratio assumes an inadequate value. In other words, attention has been paid to high accuracy of the fuel injection timing and compensating the instability of EGR ratio control by correcting the fuel injection timing. Furthermore, the actual EGR ratio is very difficult to find by detection or computation, but with the diesel engine of the present embodiment, the correlation between the EGR ratio and ignition timing has been employed and the actual EGR(ratio has been indirectly evaluated by detecting the ignition timing.

With the diesel engine of the present embodiment, because an adequate ignition timing can be constantly ensured, degradation of fuel consumption or exhaust gas can be reliably avoided.

The present invention is not limited to the above-described embodiment.

For example, in the above-described embodiment, it was explained that the ECU 26 controls the EGR valve 21 according to the target EGR valve opening degree determined from the map. However, the present invention is not limited to this configuration and it is also possible to set as a target value another parameter correlated with the EGR ratio, such as oxygen concentration in the mixture or new gas flow rate, and to control the EGR valve 21 according to this target value. For example, the new gas flow rate may be set as a target value and the EGR valve 21 may be feedback controlled so that the detected value of the intake quantity sensor 32 (see FIG. 1) matches the target value.

Further, in the present embodiment, the optimum ignition timing was explained as the compression top dead center TDC of the piston, but the present invention is not limited thereto. Furthermore, the optimum ignition timing is not limited to a fixed value and may be changed appropriately based on the engine operation state.

Further, the ignition timing detection means is not limited to a knock sensor 31 and another means, such as a cylinder pressure sensor or ion sensor, may be employed. However, the advantage of the knock sensor 31 over other sensors is that it has a lower cost.

The EGR apparatus is not limited to the external EGR apparatus and may be an inner EGR apparatus for opening the exhaust valve in the intake stroke.

In the present embodiment, an example was explained in which the ignition timing was maintained as an optimum ignition timing when the EGR ratio shifted from the adequate value. In the second embodiment described hereinbelow, the premixing period, which is yet another important parameter in the premixed combustion, is maintained as an optimum premixing period.

More specifically, the actual premixing period from the end of fuel injection to the mixture ignition is constantly computed and determined, the actual premixing period is compared with the preset optimum premixing period (target premixing period), and the fuel injection timing is corrected according to the difference (shift) between the two.

Means for measuring and detecting the premixing period can be composed of means for detecting the fuel injection end timing, ignition timing detection means (knock sensor 31, or the like), and a timer contained in the ECU 26.

The fuel injection end timing can be judged by the ECU 26 based on the fuel injection period and fuel injection start timing determined from the above-described map. Thus, a timing fuel injection end timing can be obtained by adding a fuel injection period to the fuel injection start timing. Alternatively, the fuel injection end timing may be directly detected based on the detected values of the sensor for detecting the shift quantity of the needle valve of the injector 9 or the common rail pressure sensor 24.

It can be assumed that when the actual premixing period detected and measured with the premixing period measurement means shifts from the optimum premixing period (target premixing period), the EGR ratio shifts from the adequate value (target EGR ratio). For example, when the actual premixing period is shorter than the optimum premixing period, the EGR ratio is lower than the adequate value and the oxygen concentration in the mixture is apparently too high. Conversely, when the actual premixing period is longer than the optimum premixing period, the EGR ratio is higher than the adequate value and the oxygen concentration of the mixture is apparently too low.

Accordingly, in such cases, the ECU 26 feedback controls the fuel injection timing (corrects the target fuel injection timing) so that the actual premixing period matches the optimum premixing period.

Figure 2D:
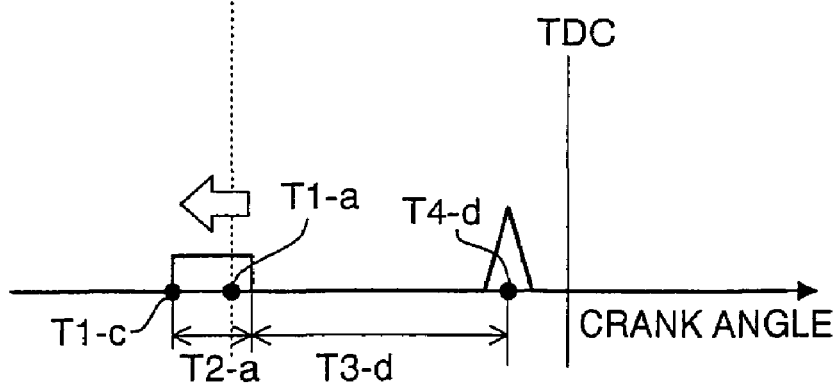
FIG. 2d illustrates an example of a state in which the actual premixing period was matched with the optimum premixing period by correcting the fuel injection timing.

For instance, in the example shown in FIG. 2b, the premixing period T3-b is shorter than the optimum premixing period (target premixing period) T3-a (see FIG. 2a). Therefore, in this case, the ECU 26 corrects the target fuel injection timing to the advance angle side (T1-a→T1-c) as shown in FIG. 2d. As a result, the pressure inside a cylinder during fuel injection is further decreased. Therefore, the premixing period is extended and matches the optimum premixing period (T3-d=T3-a).

Further, when the actual premixing period becomes longer than the optimum premixing period T3-a, the target fuel injection timing is corrected to the retard angle side and matched with the optimum premixing period T3-a.

Here, because the optimum premixing period (target premixing period) is different for each engine operation state, it is inputted in advance into the ECU 26 as a map, and the ECU 26 reads the engine operation state from the detected values of each sensor and then determines the optimum premixing period (target premixing period) from the map.

With this embodiment an adequate premixing period can be constantly ensured, and the exhaust gas can be effectively improved.

As described hereinabove, the benefit obtained by the diesel engine of the present embodiment is that the ignition timing or premixing period of the mixture during premixed combustion can be optimally controlled.

What is claimed is:

1. A diesel engine comprising:
    a fuel injection apparatus for injecting a fuel into a combustion chamber;
    an EGR apparatus for returning part of exhaust gas into the combustion chamber;
    a control apparatus for controlling the fuel injection apparatus and the EGR apparatus so as to realize a premixed combustion in which a mixture, which is formed by a fuel injection completed before the compression top dead center, is compression ignited in the vicinity of the compression top dead center; and
    detection means for detecting an actual ignition timing of the mixture in a premixed region;
    wherein when the actual ignition timing detected by the detection means shifts from a preset optimum ignition timing in the vicinity of the compression top dead center, the control apparatus corrects the timing of fuel injection conducted by the fuel injection apparatus based on the difference between the actual ignition timing and the optimum igntion timing and matches the actual ignition timing with the optimum ignition timing.

2. The diesel engine according to claim 1, wherein the control apparatus determines the target fuel injection timing based on the engine operation state, controls the fuel injection apparatus according to the target fuel injection timing, corrects the target fuel injection timing to a retard angle side when the actual ignition timing detected by the detection means is earlier than the optimum ignition timing, and, conversely, corrects the target fuel injection timing to the advance angle side when the actual ignition timing is later than the optimum ignition timing.

3. The diesel engine according to claim 1, wherein the detection means for detecting the ignition timing of the mixture is a knock sensor.

4. The diesel engine according to claim 2, wherein the detection means for detecting the ignition timing of the mixture is a knock sensor.

5. The diesel engine according to claim 1, wherein the optimum ignition timing is a compression top dead center of a piston.

6. The diesel engine according to claim 2, wherein the optimum ignition timing is a compression top dead center of a piston.

7. The diesel engine according to claim 1, wherein a computation formula having set therein a correction quantity of the fuel injection timing that is necessary for eliminating the difference between the actual ignition timing and the optimum ignition timing is inputted into the control apparatus; and the control apparatus corrects the timing of fuel injection conducted by the fuel injection apparatus according to the correction quantity determined from the computation formula when the actual ignition timing detected by the detection means shifts from the preset optimum ignition timing.

8. The diesel engine according to claim 2, wherein a computation formula having set therein a correction quantity of the fuel injection timing that is necessary for eliminating the difference between the actual ignition timing and the optimum ignition timing is inputted into the control apparatus; and the control apparatus corrects the timing of fuel injection conducted by the fuel injection apparatus according to the correction quantity determined from the computation formula when the actual ignition timing detected by the detection means shifts from the preset optimum ignition timing.

9. A diesel engine comprising:
    a fuel injection apparatus for injecting a fuel into a combustion chamber;
    an EGR apparatus for returning part of exhaust gas into the combustion chamber; and
    a control apparatus for controlling the fuel injection apparatus and EGR apparatus so as to realize a premixed combustion in which a mixture, which is formed by a fuel injection completed before the compression top dead center, is compression ignited in the vicinity of the compression top dead center; and
    measurement means for measuring an actual premixing period from the completion of fuel injection before the compression top dead center conducted by the fuel injection apparatus to the ignition of the mixture;
    wherein when the actual premixing period measured by the measurement means shifts from a preset optimum premixing period, the control apparatus corrects the timing of fuel injection conducted by the fuel injection apparatus based on the difference between the actual premixing period and the optimum premixing period and matches the actual premixing period with the optimum premixing period.

10. The diesel engine according to claim 9, wherein
    the control apparatus determines the target fuel injection timing based on the engine operation state, controls the fuel injection apparatus according to the target fuel injection timing, corrects the target fuel injection timing to a retard angle side when the actual premixing period measured by the measurement means is longer than the optimum premixing period, and, conversely, corrects the target fuel injection timing to the advance angle side when the actual premixing period is shorter than the optimum premixing period.

11. The diesel engine according to claim 9, wherein the optimum premixing period is determined for each engine operation state.

12. The diesel engine according to claim 10, wherein the optimum premixing period is determined for each engine operation state.

* * * * *